June 26, 1956     J. H. KROOSS     2,752,173
FLEXIBLE OR RIGID JOINT PIPE COUPLINGS
Filed June 2, 1952
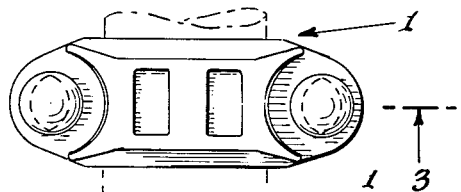
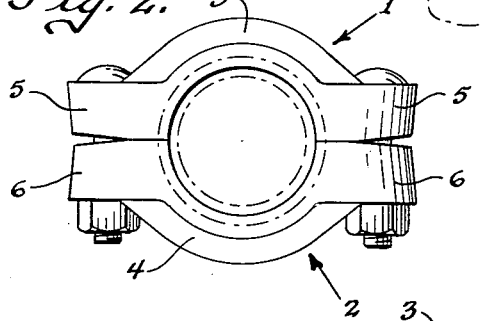
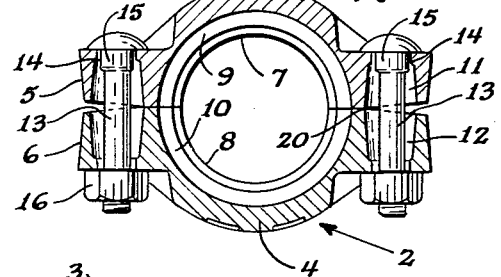
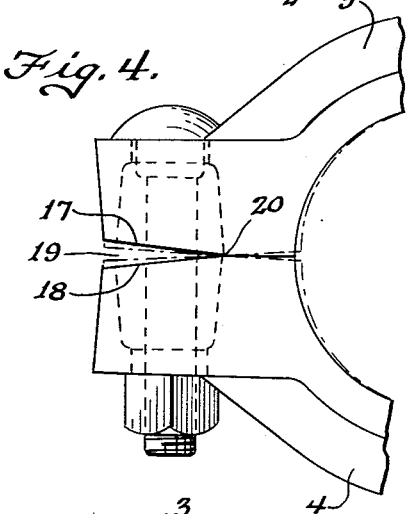
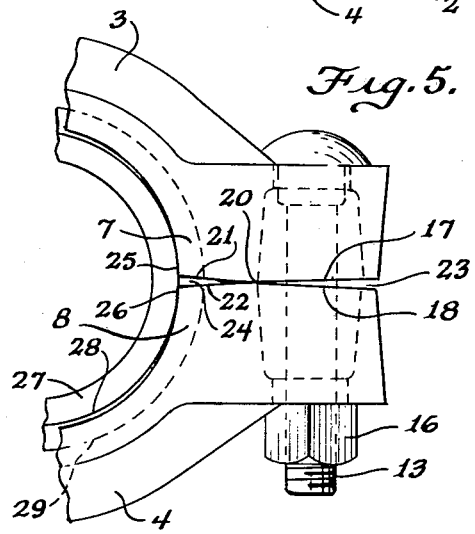
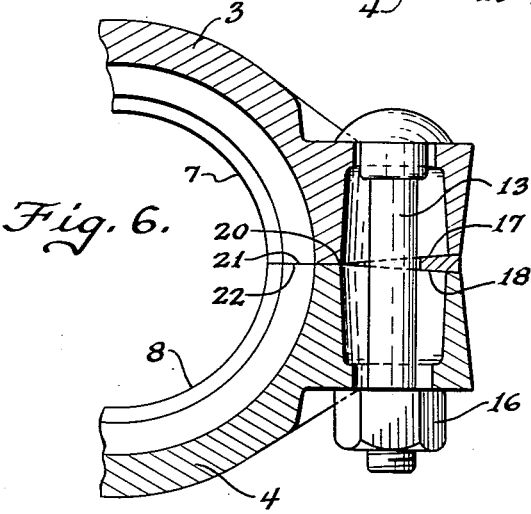
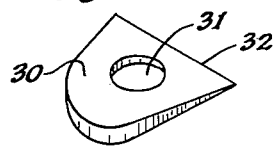
INVENTOR.
JOHN H. KROOSS
BY
ATTORNEY.

United States Patent Office 2,752,173
Patented June 26, 1956

2,752,173

FLEXIBLE OR RIGID JOINT PIPE COUPLINGS

John H. Krooss, Westfield, N. J., assignor to Victaulic Company of America, Union, N. J., a corporation of New Jersey Application June 2, 1952, Serial No. 291,220

4 Claims. (Cl. 285—129)

This invention relates to pipe couplings, and more particularly to quickly applicable couplings for forming leak-proof joints between sections of grooved end pipe.

The art of coupling grooved end pipe has developed to considerable extent since the introduction of the internal pressure type of gasket, as shown in the U. S. patent to Ernest Tribe, No. 1,541,601 dated June 9, 1925. Pipe lines can be quickly assembled and disassembled employing this type of gasketing with coupling members formed of a plurality of housing sections, where such housing sections taken together surround the pipe ends and the gasket and are quickly applied by bolts, or otherwise. This has been done to a great extent in laying pipe lines across the terrain following the contours thereof. Instances of this are in gathering lines in the oil fields, and fuel lines for supplying the military as in the last war. In these and some of the other uses of such couplings, a certain flexibility of the couplings while maintaining a fluid-tight joint is often desirable.

In laying out other pipe lines, however, such as the piping in industrial plants, such flexibility of the coupling is a drawback. It allows sag and floppiness in the pipe, and it permits valves to swivel into undesirable positions. It also creates unsightly conditions and requires the use of an excessive number of supports to overcome it and to properly align the piping system. Thus, the flexibility of the prior art couplings, which is such a boon in some situations, has undesirable characteristics in other situations.

This invention is accordingly concerned with the provision of a coupling for grooved end pipe which is equally effective for all situations. In other words, the coupling of the invention provides for the flexible joining of grooved end pipe when such joining is desired and can also be effectively employed for making rigid, as distinguished from flexible, joints, where rigidity of the pipe lines is required. This is accomplished in simple, economical fashion and without complicating the construction. In the description to follow, this coupling will be referred to as a "universal" coupling.

It is, accordingly, the principal object of this invention to provide a coupling for grooved end pipe which may be employed to provide either a flexible or rigid joint.

Another object is to provide such coupling of utmost simplicity.

Another object is to provide such coupling which is effective for the forming of either flexible or rigid joints with the same pipe formation.

Still another object is to provide universal pipe couplings applicable in a manner known to workmen acquainted with the handling of flexible pipe couplings.

Further and more detailed objects of the invention will in part be obvious and in part be pointed out as the description of the invention, taken in conjunction with the accompanying drawing proceeds.

In that drawing:

Figure 1 is a top plan view of a coupling in accordance with the invention illustrating the application of the same to a pipe.

Figure 2 is a front elevation of the coupling of Figure 1 secured so as to form a flexible joint.

Figure 3 is a vertical section taken on line 3—3 of Figure 1 and looking in the direction of the arrows.

Figure 4 is an enlarged fragmentary elevation of the left hand portion of a coupling as shown in Figure 2 but illustrating in solid and in dot-dash lines respectively the different positions into which the coupling can be set for forming flexible joints on one hand, and rigid joining on the other.

Figure 5 is an enlarged fragmentary elevation of the right hand portion of the coupling as seen in Figure 2, but including a section of pipe and having a portion of the coupling broken away and in section to illustrate the manner in which the key sections of the coupling grip the pipe when providing a rigid joint therewith.

Figure 6 is a vertical section of a fragment of the coupling showing the use of a shim there, and Figure 7 is a perspective view of the shim per se.

In order to better illustrate the essentials of the invention, the showing of the gasket for surrounding the pipe ends and providing a tight joint thereat has been omitted. It is to be understood, however, that the gasket employed is preferably of the internal pressure type, generally as illustrated in the Tribe Patent No. 1,541,601 above referred to. The structure illustrated thus consists merely of the two half housings of a coupling and a small section of pipe. It is to be understood that a suitable gasket is employed therewith and that the advances the invention introduces over the prior art are achieved without change in established gasket construction.

The coupling illustrated in the accompanying drawing accordingly consists of an upper housing, generally indicated at 1, and a lower housing, generally indicated at 2. Here it is pertinent to note that though a coupling consisting of any two half housings is here shown, it is to be understood that where larger couplings, requiring a greater number of housings to properly encompass the pipe ends, are needed, the invention is applicable thereto in the same manner as to the two-housing construction here shown. Each of the semi-circular housings 1 and 2 have portions 3 and 4 for overlying one-half of a pipe. The portion 3 has identical bolt pads 5 extending laterally therefrom and the section 4 is likewise provided with bolt pads 6.

The portions 3 and 4 are provided with mating key sections 7 and 8 of smaller diameter than the outside diameter of the pipe sections to be joined. These key sections are dimensioned to seat in the customary groove formed in the outer surface of the pipe to prevent the pipes from separating endwise. The interiors of the portions 3 and 4 are further formed with gasket embracing mating recesses 9 and 10 bordered at each side by the key sections 7 and 8. Such gasket, as already indicated, has been omitted in the interests of clarity of illustration. The bolt pads 5 and 6 are recessed at 11 and 12 for the passage of clamping bolts 13 therethrough. The recesses 11 and 12 normally terminate in non-circular openings 14 to receive the non-circular shank 15 of the bolt 13 and thus preclude rotation of the bolt when the nuts 16 are being tightened up.

The imparting of the universal characteristics to the coupling of the invention is achieved by specially forming the inner faces of the bolt pads 5 and 6, and properly relating such formations to each other as the bolt pads of mated half housings are brought together. This particular formation and the action thereof is best illustrated in the enlarged showings of Figures 4 and 5.

In Figure 4, the portions of the half housings and the bolt pads are shown in the absence of any pipe. Here it will be seen that the outer parts of the opposed faces of the bolt pads are inclined away from each other, as indicated at 17 and 18. Thus, in the assembled untightened condition of the coupling, an open angle is present between the outer portions of the opposed faces of the bolt pads. This angle is indicated at 19 having its apex at the line 20 which extends across the pads at substantially the inner border of their bolt hole recesses.

From the line 20 inwardly of the pads, the remaining portions 21 and 22 of the opposed faces are radial. Thus the portions 21 and 22 normally lie against each other. This relationship is established on the assembly of the housing members together. It prevails so long as tightening of the nut 16 on the bolt 13 is only carried to the extent normally required in applying the couplings to form flexible joints between sections of grooved end pipe. Thus, the application of the coupling in the normal manner heretofore recognized in the art, causes it to function as would be expected in the absence of the open angle 19.

In the event, however, that a rigid joint is desired with the pipes included in it being held in alignment and being prevented from turning, all that needs to be done is to continue the tightening of the nut 16. This additional tightening causes a closing of the angle 19 into a smaller angle such as 23 shown at Figure 5, or even a closing of it entirely. The bolt pads are thus sprung, or fulcrumed about the line 20 extending transversely thereof. This action serves to open up a small angle 24 between the inner face portions 21 and 22 and causes the portions 25 and 26 of the key sections 7 and 8, adjacent the ends of the housings, to be projected inwardly with respect to the opening bordered by the housings.

Where flexible joints are desired, the surfaces 21 and 22 remain radial and in engagement with each other. Here the key sections 7 and 8 of the housings form a circle which is somewhat freely received in the grooves formed in each of the pipes. Figure 5, however, illustrates what happens when the nuts 16 are tightened sufficiently to cause the joint to become rigid. A fragment of pipe is shown at 27 having a groove therein with a bottom 28 and having an outside diameter as indicated at the dotted line 27. The portions 25 and 26 of the key sections have been projected inwardly to a sufficient extent to grip the bottom of the groove 23 and prevent movement of the coupling with respect to the pipe. This gripping is of a clamping, or vise-like nature, since it is applied against the pipe on opposite sides of a diameter thereof. It can thus provide a rigid joint without being of such severity as to distort the pipe.

To enhance the illustration, the showing of the angles 19 and 23 in the accompanying drawing has been exaggerated. Actually, an effective gripping action can be produced employing an angle 19 small enough so that the surfaces 17 and 18 will come together with the application of slightly more than normal wrench torque. As illustrative of effective angles for producing proper clamping action, it has been found that for couplings to join 2" and 3" pipe, a surface on each bolt pad with a taper of 3½°, thus forming a total angle of 7°, is entirely adequate. For the coupling of a 4" pipe, a taper of 2½° for each surface, or a total angle of 5° between the surfaces 17 and 18, has been found to be effective. The angles here mentioned are merely included for the purposes of illustration and not by way of limitation. Angles varying substantially from those recited can be employed with fully effective results.

Though, normally, workmen employed in the joining of pipe ends by the use of the couplings just described will be appreciative of the wrenching force required to leave the joint in flexible state, positive assurance on that score can be readily attained by employing the addition illustrated in Figures 6 and 7. Here a wedge shaped shim 30 is provided for insertion between the surfaces 17 and 18 to prevent them from being drawn together. This shim is perforated at 31 to fit over the shank of the bolt 13 and is properly seated in position by the provision of an inner straight edge 32 to lie substantially along the line 20. Obviously, the interposition of the shim will preclude the closing up of the angle between the surfaces 17 and 18 and will thus preclude any portions of the key section, such as 25 and 26 of Figure 5 from being forced inwardly to clamp the pipe.

The preferred form of the invention has been shown in the accompanying drawing and described in the foregoing text. It is to be understood, however, that such showing and description are to be considered in an illustrative rather than in a limiting sense, and that variations and modifications in the above construction as would suggest themselves to those skilled in the art, can be made without departing from the spirit and scope of the invention.

Having described my invention, what I claim as new and desire to secure by Letters Patent is:

1. A housing for a grooved end pipe coupling and for assembly with another substantially identical housing for coupling pipe sections together by either a rigid or flexible joint which comprises, an arcuate member forming an arc of a circle, said arcuate member being formed internally with a gasket receiving recess, said gasket receiving recess having a base and said base being bordered at each side by upstanding continuous collars having pipe groove engaging end faces normally concentric with the arc of said arcuate member for normally movably engaging the similarly curved bases of grooves in the surface of a pipe, lugs extending outwardly at each end of said arcuate member, the outer portions of said lugs being formed for the reception of a clamping member, the ends of said arcuate member and the under face of the adjacent lugs forming surfaces generally transverse with respect to said arcuate member for engagement with similar surfaces on said other housing when said housings are assembled together, said transverse surfaces being formed with inner and outer surface portions meeting at fulcrum lines extending across said transverse surfaces, each of said inner surface portions normally lying in a plane extending radially with respect to the curvature of said arcuate member and each of said outer surface portions lying in a plane inclined outwardly from said fulcrum line at an angle with respect to the plane of its adjoining inner surface portion, said fulcrum lines being positioned back of said base of said recess, said pipe groove engaging faces of such assembled housings forming a continuous circular curve movably receivable in said pipe grooves to provide a flexible joint when said inner surface portions of said assembled housings are in engagement and the clamping members securing said housings together are under normal stress and on further tightening of said clamping means, said inner surface portions being separated at an angle about said fulcrum and portions of said pipe groove engaging faces of said collars adjacent the ends of said arcuate members being deformed inwardly and departing from their circular contour to tightly engage the adjacent portions of the base of said pipe groove to provide a rigid joint.

2. A coupling for grooved end pipe and for coupling sections thereof together by either a rigid or flexible joint which comprises, a pair of substantially identical housings, clamping means to engage a portion of each of said housings, each of said housings including an arcuate member forming an arc of a circle, said arcuate members being formed with arcuate gasket receiving recessed portions therein, said portions joining together to form a continuous gasket receiving recess when said housings are assembled together, said gasket receiving recess having a base and said base being bordered at each side by upstanding continuous collars having pipe groove engaging end faces normally concentric with the arc of said arcuate members for normally movably engaging the similarly curved bases of grooves in the surface of a pipe, lugs forming part of said housings and extending outwardly at the ends of each of said arcuate members, the outer portions of said lugs being formed for the reception of said clamping means, the ends of said arcuate members and the under faces of the adjacent lugs forming surfaces generally transverse with respect to said arcuate members, the surfaces on one of said housings mating with and engaging the surfaces of the other of the housings, each of said transverse surfaces being formed with inner and outer portions meeting at a fulcrum line extending across said transverse surface, each of said inner surface portions normally lying in a plane extending radially with respect to the curvature of the arcuate member carrying it, and each of said outer surface portions lying in a plane inclined outwardly from said fulcrum line at a small angle with respect to the plane of its adjoining inner surface portion, said fulcrum line being positioned back of the base of said recess, said pipe groove engaging faces of said housings forming a continuous circular curve movably receivable in said pipe grooves to provide a flexible joint when said inner surface portions of said assembled housings are in engagement and when the clamping means securing said housings together are under normal stress and on further tightening of said clamping members, said inner surface portions being separated at an angle about said fulcrum and portions of said pipe groove engaging faces of said collars adjacent the ends of said arcuate members being deformed inwardly and departing from their circular contour to tightly engage adjacent portions of the bases of said pipe grooves to provide a rigid joint.

3. A pipe coupling as in claim 2, said clamping means being bolts received by said outer portions of said lugs, and nuts carried by said bolts for the drawing together of said lugs.

4. A pipe joint for the rigid or flexible joining together of pipe sections which comprises, a pair of sections of grooved end pipe, each of said sections being formed with an annular groove around the outer surface thereof adjacent an end thereof, a pair of substantially identical coupling housings for coupling said pipe sections together, and clamping means to engage a portion of each of said housings each of said housings including an arcuate member forming an arc of a circle, said arcuate members being formed with arcuate gasket receiving recessed portions therein, said portions joining together to form a continuous gasket receiving recess when said housings are assembled together, said gasket receiving recess having a base and said base being bordered at each side by upstanding continuous collars having pipe groove engaging end faces normally concentric with the arc of said arcuate members, one of said collars being seated in a groove in one of said pipe ends and the other of said collars being seated in the groove in the other of said pipe ends and said collars having pipe groove engaging end faces normally movably engaging the similarly curved bases of said pipe grooves, lugs forming part of said housings and extending outwardly at the ends of said arcuate members, the outer portions of said lugs being formed for the reception of said clamping means, the ends of said arcuate members and the under faces of the adjacent lugs forming surfaces generally transverse with respect to said arcuate members, the surfaces on one of said housings mating with and engaging the surfaces on the other of the housings, each of said transverse surfaces being formed with inner and outer portions meeting at a fulcrum line extending across said transverse surface, each of said inner surface portions normally lying in a plane extending radially with respect to the curvature of the arcuate member carrying it and each of said outer surface portions lying in a plane inclined outwardly from said fulcrum line at a small angle with respect to the plane of its adjoining inner surface portion, said fulcrum line being positioned back of the base of said recess, the inner surface portions of opposed ends of said arcuate members lying in engagement in the same plane and said pipe groove engaging faces of said housings forming a continuous circular curve movably receivable in said pipe grooves and providing a flexible joint when said clamping means securing said housings together are under normal stress and, on further tightening of said clamping means, said inner surface portions being separated at an angle about said fulcrum and portions of said pipe groove engaging faces of said collars adjacent the ends of said arcuate members, being deformed inwardly, departing from their circular contour and tightly engaging the bases of said pipe grooves to provide a rigid joint.

References Cited in the file of this patent

UNITED STATES PATENTS

| | | |
|---|---|---|
| 1,541,601 | Tribe | June 9, 1925 |
| 1,888,241 | Rah | Nov. 22, 1932 |
| 2,218,835 | Ulrich | Oct. 22, 1940 |
| 2,387,410 | Roe | Oct. 23, 1945 |
| 2,424,542 | Adams | July 29, 1947 |
| 2,473,046 | Adams | June 14, 1949 |
| 2,473,102 | Krooss | June 14, 1949 |
| 2,690,103 | Smith | Sept. 28, 1954 |